(12) United States Patent
Sinichko et al.

(10) Patent No.: US 7,871,651 B2
(45) Date of Patent: Jan. 18, 2011

(54) THERMOFORMED PLASTIC CONTAINER FOR CHOCOLATE

(75) Inventors: Henry Sinichko, Grimsby (CA); Paul B. Abernathy, West Orange, NJ (US); Paul K. Bowers, Long Valley, NJ (US)

(73) Assignee: Cadbury Adams USA LLC, Parsippany, NJ (US)

( * ) Notice: Subject to any disclaimer, the term of this patent is extended or adjusted under 35 U.S.C. 154(b) by 1107 days.

(21) Appl. No.: 11/205,567

(22) Filed: Aug. 17, 2005

(65) Prior Publication Data

US 2006/0062874 A1     Mar. 23, 2006

Related U.S. Application Data

(60) Provisional application No. 60/612,371, filed on Sep. 23, 2004.

(51) Int. Cl.
*A23G 3/50* (2006.01)

(52) U.S. Cl. .................. 426/104; 426/106; 426/414; 220/4.01; 220/4.05; 220/4.03; 220/4.07; 53/441

(58) Field of Classification Search ............... 426/104, 426/106, 414; 220/4, 4.01, 4.05, 4.06, 4.07; 156/86, 277; 53/441
See application file for complete search history.

(56) References Cited

U.S. PATENT DOCUMENTS

| | | | | | |
|---|---|---|---|---|---|
| 1,041,315 | A | * | 10/1912 | Marx | 206/204 |
| 1,705,328 | A | * | 3/1929 | Griffith | 249/120 |
| 1,715,757 | A | | 6/1929 | Hirtzler | |
| 1,780,091 | A | * | 10/1930 | Meinhofer | 249/133 |
| 1,906,882 | A | * | 5/1933 | Artur Perret | 249/137 |
| 1,948,146 | A | * | 2/1934 | Warren | 249/171 |
| 2,032,329 | A | * | 2/1936 | Reiche | 249/171 |
| 2,796,033 | A | * | 6/1957 | Feinstein | 426/394 |
| 2,998,896 | A | | 9/1961 | Miller | |
| 3,043,354 | A | * | 7/1962 | Fitzgerald | 220/4.23 |
| 3,122,441 | A | * | 2/1964 | Smith | 426/91 |
| 3,292,840 | A | | 12/1966 | Schmidt | |
| 3,829,348 | A | * | 8/1974 | Spiegel et al. | 428/11 |
| 4,124,135 | A | * | 11/1978 | Weder et al. | 220/4.21 |
| 4,244,470 | A | * | 1/1981 | Burnham | 206/525 |

(Continued)

FOREIGN PATENT DOCUMENTS

WO    WO 97/34500    9/1997

OTHER PUBLICATIONS

Lovegren, N.V. Solidification of Cocoa Butter, The Journal of the American Oil Chemists' Society, vol. 42, No. 4, Apr. 1965.*

*Primary Examiner*—Rena L Dye
*Assistant Examiner*—Chaim Smith
(74) *Attorney, Agent, or Firm*—Hoffmann & Baron, LLP

(57) ABSTRACT

An article of manufacture includes (a) a three-dimensionally shaped edible candy including chocolate; and (b) a hollow container including a wall defining an exterior surface and an interior surface, the interior surface defining a hollow portion having a shape which substantially conforms to the three-dimensional shape of the candy for releasably securing the candy within the hollow shape of the container, wherein the container includes at least two portions removably secured to one and the other for releasably securing the candy, and further wherein the container includes a plastic material, such as a thermoformed plastic material.

18 Claims, 2 Drawing Sheets

U.S. PATENT DOCUMENTS

| | | | |
|---|---|---|---|
| 4,530,201 A * | 7/1985 | Carlsson | 53/397 |
| 4,732,273 A * | 3/1988 | DeMarco | 206/470 |
| 4,765,501 A | 8/1988 | Kao | |
| D305,616 S * | 1/1990 | Johnson | D9/426 |
| 4,966,780 A * | 10/1990 | Hargraves et al. | 426/118 |
| 5,064,073 A | 11/1991 | Folland | |
| 5,156,277 A | 10/1992 | Witz | |
| D359,607 S * | 6/1995 | Yun | D1/106 |
| 5,458,277 A * | 10/1995 | Wyzykowski | 224/604 |
| 5,702,742 A * | 12/1997 | Jones | 426/115 |
| 5,728,414 A * | 3/1998 | Terrasi | 426/104 |
| D393,421 S | 4/1998 | Kovens | |
| 5,925,391 A * | 7/1999 | Whetstone, Jr. | 426/90 |
| 5,955,099 A * | 9/1999 | White | 424/440 |
| 5,988,424 A | 11/1999 | Kovens | |
| 5,993,870 A * | 11/1999 | Hoeting et al. | 426/110 |
| 6,050,438 A * | 4/2000 | Kovens et al. | 220/4.24 |
| 6,187,350 B1 * | 2/2001 | Gallart et al. | 426/91 |
| 6,196,406 B1 | 3/2001 | Ennis | |
| D442,031 S * | 5/2001 | Perez | D7/628 |
| 6,459,513 B1 * | 10/2002 | Cox et al. | 359/1 |
| D490,304 S | 5/2004 | Landers | |
| 2003/0017234 A1 | 1/2003 | Hentzel | |
| 2003/0047481 A1 | 3/2003 | Van Heugten | |
| 2003/0082279 A1 * | 5/2003 | Chan | 426/110 |
| 2003/0087015 A1 * | 5/2003 | Wyslotsky et al. | 426/397 |
| 2003/0138529 A1 * | 7/2003 | Palmer et al. | 426/119 |
| 2003/0152672 A1 * | 8/2003 | Coleman et al. | 426/115 |
| 2003/0185943 A1 * | 10/2003 | Bradley et al. | 426/115 |

* cited by examiner

US 7,871,651 B2

THERMOFORMED PLASTIC CONTAINER FOR CHOCOLATE

CROSS-REFERENCE TO RELATED APPLICATIONS

This application claims the benefit of U.S. Provisional Application No. 60/612,371, filed Sep. 23, 2004, the contents of which are incorporated herein by reference.

FIELD OF THE INVENTION

The present invention relates to a thermoformed plastic container for chocolate. More particularly, the present invention relates to a thermoformed plastic container having a chocolate container therein.

BACKGROUND OF THE INVENTION

Certain chocolate or chocolate-containing candies having appealing three dimensional shapes, such as for example chocolate Easter eggs, chocolate Easter bunnies and the like, are typically wrapped in aluminum foil. The foil is removed by the consumer prior to consumption of the candy. During shipment or storage, however, some of the foil may be torn or otherwise displaced to expose the candy, or the candy may be broker as the foil provides little protective supporting for the candy. As a result from about 7 to about 15 percent of foil-wrapped chocolate candies are removed from the marketplace as waste or breakage. Further, such foil-wrapped chocolate candies offer little resistance to product tampering.

Thus, there is a need in the art for a container that avoids the waste or breakage problems associated with foil-wrapped chocolate candies. Further, there is a need in the art for a more tamper-resistant and/or tamper-evident container for chocolate candies.

SUMMARY OF THE INVENTION

The present invention is directed to a more tamper-resistant and/or tamper-evident container for an edible product, such as a candy, more desirably a chocolate or chocolate-containing candy.

In one aspect of the present invention, an article of manufacture is provided. The article includes (a) a three-dimensionally shaped edible candy including chocolate; and (b) a hollow container including a wall defining an exterior surface and an interior surface, the interior surface defining a hollow portion having a shape which substantially conforms to the three-dimensional shape of the candy for releasably securing the candy within the hollow shape of the container, wherein the container includes at least two portions removably secured to one and the other for releasably securing the candy, and further wherein the container includes plastic material. Desirably, the container is sufficiently rigid to maintain its shape when the candy is not present within the hollow portion of the container. Desirably, the container includes a thermoformed plastic material.

The article may further include a living hinge, wherein the at least two portions of the container are secured to one and the other by the living hinge. The at least two portions of the container may be rotatably moveable about the living hinge.

The at least two portions of the container may have edge portions which abuttingly engage one and the other to releasably close the container about the candy. The edge portions may be snap-lockable to one and the other. The snap-lockable feature may be provided by the bias of the living hinge.

The article may further include a removable plastic covering over a portion of the exterior surface of the container. Desirably, the plastic covering is a shrink-wrapped plastic covering. Substantial portions of the candy may be disposed about 1 mm from the interior surface of the container to avoid possible melting from the shrink wrapping process. Portions of the candy may contact the interior surface of the container at a location or locations distal from the plastic wrapping.

In one embodiment of the present invention, the at least two portions of the container are secured to one and the other by the living hinge. The living hinge is proximal to the location where portions of the candy contact the container body or wall.

The container may be formed from thermoformed plastic material, such as polystyrenes, polypropylenes, polyethylenes, polyethylene terephthalates, polyvinyl chloride polystyrenes, polyvinylydene chlorides, fluoride resins, polycarbonates, polyamides, polyphenylene oxides, and combinations thereof.

Desirably, the container is a thin-walled container having a thickness of less than about 1 mm.

The candy and the hollow portion of the container may be substantially egg-shaped, or the candy and the hollow portion of the container may be substantially animal-shaped, for example in the form of a rabbit. Virtually any shapes are possible, including, but not limited to, heart-shaped and Christmas tree shaped containers.

In another aspect of the present invention a method of releasably securing a candy within a container is provided. The method includes the steps of (a) providing a three-dimensionally shaped edible candy having an outer surface including chocolate; (b) providing a hollow container including a wall defining an exterior surface and an interior surface, the interior surface defining a hollow portion having a shape which substantially conforms to the three-dimensional shape of the candy for releasably securing the candy within the hollow shape of the container, wherein the container includes at least two portions removably secured to one and the other for releasably securing the candy, and further wherein the container includes a plastic material; (c) securing the candy within the container; and (d) heat wrapping a plastic sleeve over a portion of the exterior surface of the container, wherein the candy within the container is not melted or deformed by elevated temperatures of the heat wrapping. Desirably, the container includes a thermoformed plastic material.

In another aspect of the present invention, an article of manufacture includes (a) a three-dimensionally shaped, heat or moisture sensitive edible product; and (b) a hollow container including a wall defining an exterior surface and an interior surface, the interior surface defining a hollow portion having a shape which substantially conforms to the three-dimensional shape of the edible product for releasably securing the edible product, such as a candy, within the hollow shape of the container, wherein the container includes at least two portions hingeably secured to one and the other for releasably securing the edible product, and further wherein the container includes a plastic material. Desirably, the container includes a thermoformed plastic material.

In still another aspect of the present invention, a method of releasably securing a heat or moisture sensitive edible product within a container includes the steps of (a) providing a three-dimensionally shaped edible heat or moisture sensitive edible product having an outer surface; (b) providing a hollow container including a wall defining an exterior surface and an interior surface, the interior surface defining a hollow portion having a shape which substantially conforms to the three-dimensional shape of the edible product for releasably securing the edible product within the hollow shape of the container, wherein the container includes at least two portions hingeably secured to one and the other for releasably securing the edible product, and further wherein the container includes a plastic material; (c) securing the edible product within the container; and (c) heat wrapping a plastic sleeve over a portion of the exterior surface of the container, wherein the edible product within the container is not melted or deformed by elevated temperatures of the heat wrapping. Desirably, the container includes a thermoformed plastic material.

DETAILED DESCRIPTION OF THE INVENTION

The present invention provides a self-supporting, rigidly shaped container for releasably holding a chocolate or chocolate including candy that avoids the disadvantages of prior art foil-wrapped, chocolate candies. The container of the present invention advantageously provides a more secure barrier over the chocolate to provide tamper resistance and to minimize product lose due to contain failure.

Figure 1:
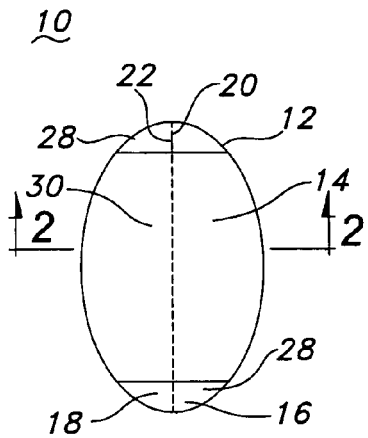
FIG. 1 is a side elevational view of a segmented candy container of the present invention having a shrink-wrapped label over portions of the container.

FIG. 1 is a side elevation view of an article of manufacture 10 which includes a segmented egg-shaped container 12, a shrink-wrapped sleeve or label 14 disposed over certain exterior portions 30 of the container 12 while not being disposed over other portions 28 of the container 12, and a candy (not shown), interrelated as shown in FIG. 1. While the container in FIG. 1 is depicted as egg-shaped, the present invention is not so limited and other shaped containers may suitably be used. Nonlimiting examples of other suitably shaped containers include, but are not limited to, almond-shaped, bell-shaped, bolus-shaped, brick-shaped, cone-shaped, cube-shaped, cylindrical-shaped, donut-shaped, figurine-shaped, heart-shaped, pear-shape, pouch-shaped, pretzel-shaped, pyramid-shaped, ring-shaped, rod-shaped, spherical-shaped, star-shaped, and wedge-shaped containers.

The segmented container 12 includes two half portions 16 and 18 having respective abutting edge portions 20 and 22.

Although the segmented container 12 is depicted as having substantially equal or two half portions 16, 18, the present invention is not so limited. The portions 16, 18 may be of any size or proportionality suitable for ingress and for egress of a candy (not shown) into and out of the container 12.

Figure 2:
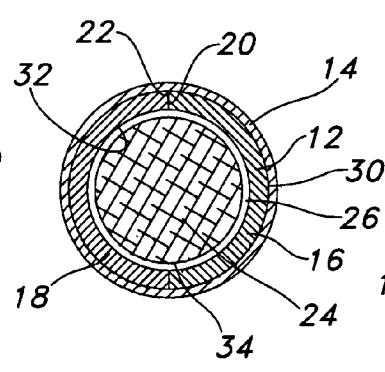
FIG. 2 is a cross-sectional view of the container of FIG. 1 taken along the 2-2 axis.

FIG. 2 is a cross-sectional view of the article 10 of FIG. 1 taken along the 2-2 axis. Candy 24 is releasably contained within the container 12. Desirably, the candy 24 is a chocolate or chocolate including candy, for example a chocolate covered confectionary or candy. The exterior portion 34 of the candy 24 is proximally disposed, but spaced apart, from the interior side wall portion 32 of the container 12. In other words, the exterior portion 34 of the candy 24 is proximally disposed in substantially non-abutting fashion to the interior wall portion 32 of the container 12. The candy 24 need not be spaced apart from all side wall portions 32 of the container 12. For example, the candy 24 may abut side wall portions 32 of the container that are not covered by the shrink-wrapped label, for example interior wall portions associated with uncovered exterior container portions 28. The shrink-wrapped label 14 is disposed in abutting relationship over exterior container portions 30 of the container 12.

Where the candy is in non-abutting relationship to the container wall, a void or air space 26 is desirably disposed between the exterior portion 34 of the candy 24 and the interior side wall portion 32 of the container 12. The air space 26 act as an insulator to prevent melting or partial melting of the candy 24 as heat is applied proximally to exterior portions 30 to fit the shrink-wrap label 14 over the container 12. Desirably, the air space 26 is small in dimension, such as about 1 mm or less. This dimension is not limiting and other suitable air space 26 dimensions may suitably be used, such as from about 0.1 mm to about 2 mm. Desirably, the shape of the candy 24 substantially matches the shape of the container 12 even though the candy 24 is slightly smaller in dimension than the container 12.

Figure 3:
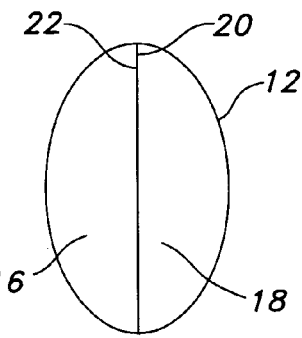
FIG. 3 is a side elevation view of the container of FIG. 1 without the shrink-wrapped label disposed over the container.

FIG. 3 depicts the container 12 in a closed position. Desirably, the edge portions 20 and 22 are substantially proximal to one and the other in the closed position. More desirably, the edge portions 20 and 22 are abuttingly disposed or engaged to one and the other. Even more desirably, the edge portions 20 and 22 are releasably snap-locked to one and the other to hold the candy 24 within the container 12. Such snap-locking may be provided by providing one of the edge portions with outwardly extending protrusions (not shown), such as bead-shaped or the like, and providing the other and opposed edge portion with indentations (not shown) that mateingly engage the protrusions to provide the releasably snap-locking feature for the container of the present invention.

Figure 4:
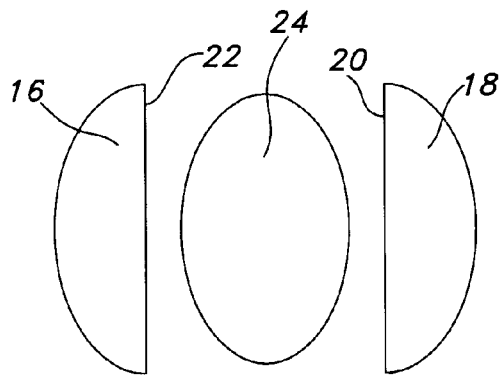
FIG. 4 is an exploded view of the segmented container of FIG. 3 showing placement of a candy within the segmented portions.
Figure 5:
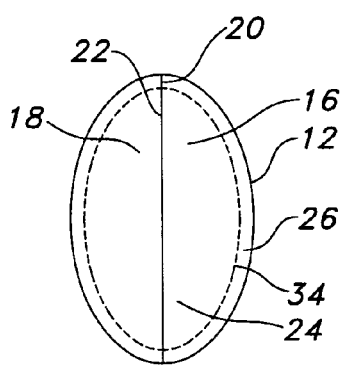
FIG. 5 is a side elevation view of the container of FIG. 3 showing a candy, as illustrated by phantom lines, disposed within the container.

FIG. 4 depicts the container 12 in an open position, revealing the candy 24. The candy 24 may be easily removed from the container 12 in its open position.

Figure 6A:
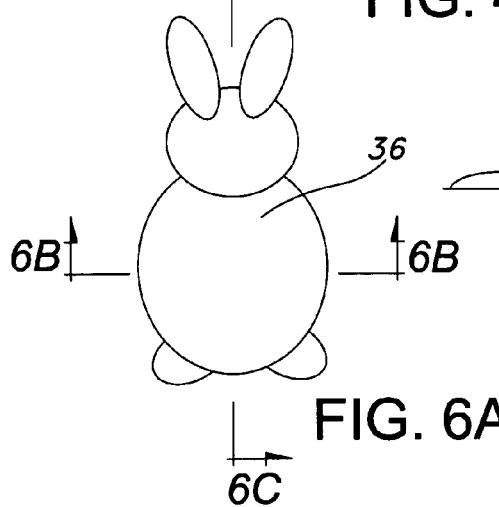
FIG. 6A is a side elevational view of a figurine-shaped container of the present invention.
Figure 6C:
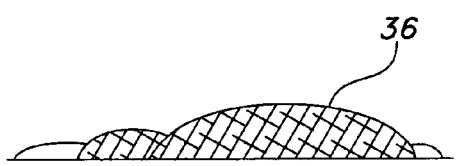
FIG. 6C is a cross-sectional view of the figurine-shaped container of FIG. 6A taken along the 6C-6C axis.
Figure 6B:
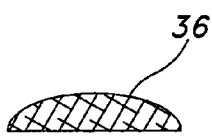
FIG. 6B is a cross-sectional view of the figurine-shaped container of FIG. 6A taken along the 6B-6B axis.

As discussed above, neither the container 12 nor the candy 24 is limited to an egg shape. For example, as depicted in FIGS. 6A-6C, the container and/or the candy may be a figurine shape 36, for example a rabbit shape typical of chocolate rabbit figurines. The configuration of the figurine 36 depicted in FIGS. 6A-6C is nonlimiting, and other three-dimensionally shaped figurines, including truncated and non-truncated shapes, may suitably be used.

Figure 7:
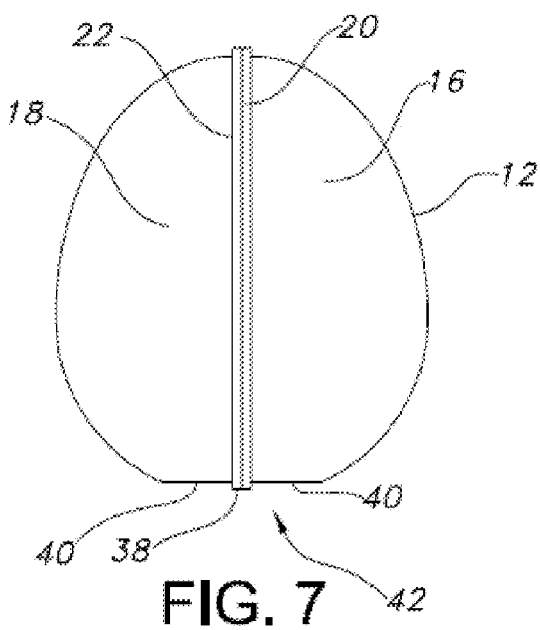
FIG. 7 is a perspective view of an egg-shaped container of the present invention in a closed position.
Figure 8:
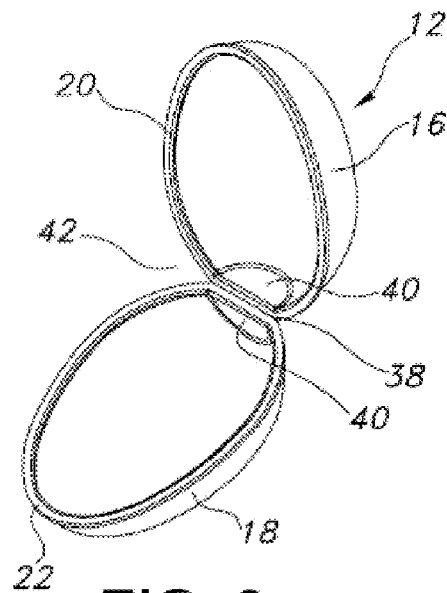
FIG. 8 is a perspective view of the egg-shaped container of FIG. 7 in a partially open position.
Figure 9:
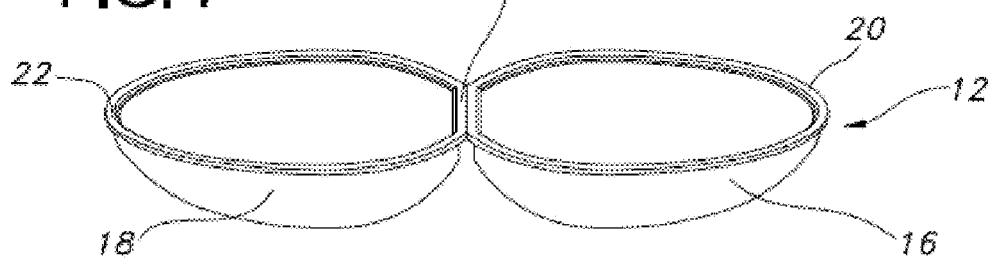
FIG. 9 is a perspective view of the egg-shaped container of FIG. 7 in a fully open position.

FIGS. 7 through 9 depict further details of the container 12 of the present invention. In this embodiment, the portions 16 and 18 of the container 12 are joined or secured to one and the other via a living hinge 38. The living hinge may impart sufficient force to keep the edge portions 20, 22 of the container portions 16, 18 in abutting relationship in the closed position as depicted in FIG. 7. The container 12 may also include a flat or otherwise shaped portion 40 near the bottom 42 of container 12. Such a flat portion 42 may vary in size and shape and is useful for forming the living hinge 38 and also useful for forming a surface for supporting the candy (not shown). As the bottom 42 of the container 12 is not typically covered with the shrink-wrapped label 14, the bottom 42 of the container 12 may not be subjected to the heat or energy associated with shrink wrapping and accordingly will not heat to an elevated temperature detrimental to the candy 24. Thus, the bottom 42 is an adequate location for the candy to be abutting the container because the risk of melting the candy is reduced as compared to other portions of the container 12. The container 12 may be in a closed position, as depicted in FIG. 7, a partially open position, as depicted in FIG. 8, or a fully open position, as depicted in FIG. 9.

The shrink wrapping involves the application of heat or energy to the label 14, whereby the label abuttingly shrinks to the container 12. Any source of energy or heat may be used, for example, thermal heat, such as hot air, steam, etc., or radiation, such as infrared frequency (IF) radiation or radio frequency (RF) radiation.

The container 12 may suitably be formed by thermoforming. Thermoforming is the process for shaping thermoplastic sheets into a structured shape through application of heat and pressure and/or vacuum. The resulting shape may be of any suitable thickness. Desirably, the resulting shape, such as container 12, is self-supporting. Useful non-limiting thicknesses for the container 12 include a thickness from about 0.001 mm to about 10 mm, desirably, from about 0.01 mm to about 1 mm, more desirably from about 0.1 mm to about 0.5 mm. Useful thermoformable plastic materials include, but are not limited to, polystyrenes, polypropylenes, polyethylenes, polyethylene terephthalates, polyvinyl chloride polystyrenes, polyvinylydene chlorides, fluoride resins, polycarbonates, polyamides, polyphenylene oxides, and the like. Moreover, the plastics may be foamed or non-foamed plastics. Further, the plastics may be transparent, translucent, tinted or colored.

Figure 10:
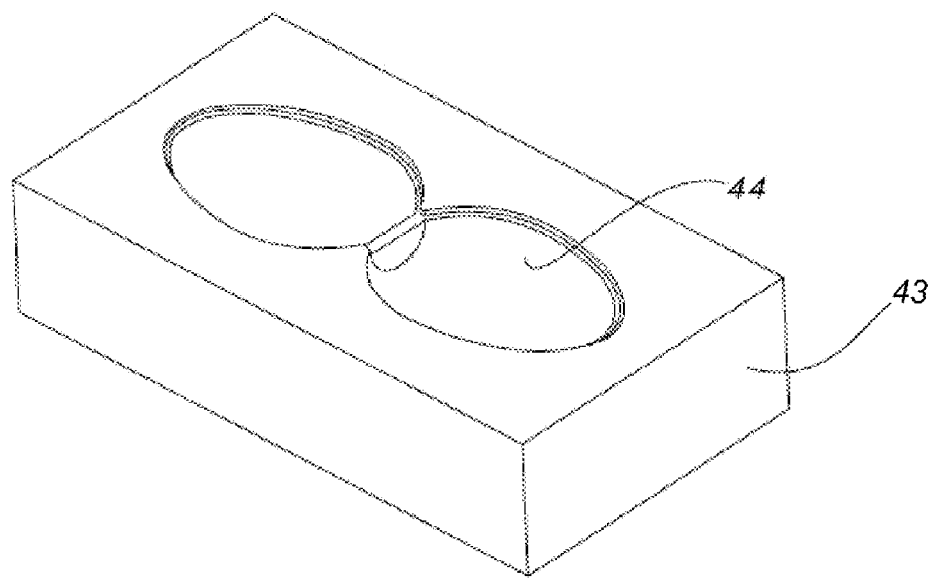
FIG. 10 is a perspective view of a mold useful for forming the container of FIGS. 7 and 8.

FIG. 10 depicts a mold 43 useful for thermoforming the container 12 of the present invention. The mold cavity 44 substantially matched the container 12 in its fully open position, as depicted in FIG. 9.

The present invention, however, is not limited to the use of thermoformed plastics or thermoforming processes for forming plastic containers, and other methods for shaping plastics may suitably be used. Other suitable plastic shaping processes include, but are not limited to, injection molding, injection blow molding, stretch blow molding, extrusion blow molding and the like. Injection molding is a process which uses force to inject plastic, typically molten or softened plastic, into a hollow mold cavity to form a shaped container. In the injection blow molding process, the plastic material is injection molded onto a core pin, is then indexed to a blow molding station where it is blown against the sides of the mold cavity by air or other compressed gas and cooled. In stretch blow molding, the plastic material is injection molded, then conditioned by stretching and temperature to provide biaxial molecular orientation, and blown into a mold. In extrusion blow molding, the plastic material is extruded, softened, and F blown against the sides of the mold cavity by air or other compressed gas and cooled.

While there have been described what are presently believed to be the preferred embodiments of the invention, those skilled in the art will realize that changes and modifications may be made thereto without departing from the spirit of the invention, and it is intended to include all such changes and modifications as fall within the true scope of the invention.

What is claimed is:

1. An article of manufacture comprising:
   a three-dimensionally shaped edible candy comprising chocolate;
   a hollow container comprising a wall defining an exterior surface and an interior surface, the interior surface defining a hollow portion having a shape which substantially conforms to the three-dimensional shape of the candy for releasably securing the candy within the hollow shape of the container, wherein the container comprises at least two portions removably secured to one and the other for releasably securing the candy, and further wherein the container comprises a plastic material; and
   a removable plastic covering over a portion of the exterior surface of the container wherein the plastic covering is a shrink-wrapped plastic covering, wherein an air space of from about 0.1 mm to about 2 mm is disposed between substantial portions of the candy and the interior surface of the container, such that substantial portions of the candy are non-abuttingly disposed away from the interior surface of the container proximal to the plastic wrapping, and further wherein portions of the candy contact the interior surface of the container at a location distal from the plastic wrapping.

2. The article of claim 1, wherein the container is rigid to maintain its shape when the candy is not present within the hollow portion of the container.

3. The article of claim 1, further comprising a living hinge, wherein the at least two portions of the container are secured to one and the other by the living hinge.

4. The article of claim 3, wherein the at least two portions of the container are rotatably moveable about the living hinge.

5. The article of claim 1, wherein the at least two portions have edge portions which abuttingly engage one and the other to releasably close the container about the candy.

6. The article of claim 5, wherein the edge portions are snap-lockable to one and the other.

7. The article of claim 1, wherein the substantial portions of the candy are disposed about 1 mm from the interior surface of the container.

8. The article of claim 1, further comprising a living hinge, wherein the living hinge is proximal to the location where portions of the candy contact the container.

9. The article of claim 1, wherein the plastic material is selected from the group consisting of polystyrenes, polypropylenes, polyethylenes, polyethylene terephthalates, polyvinyl chloride polystyrenes, polyvinylydene chlorides, fluoride resins, polycarbonates, polyamides, polyphenylene oxides, and combinations thereof.

10. The article of claim 1, wherein the plastic is a thermoformed plastic.

11. The article of claim 1, wherein the wall of the container has a thickness of less than about 1 mm.

12. The article of claim 1, wherein the candy and the hollow portion of the container are substantially egg-shaped.

13. The article of claim 1, wherein the candy and the hollow portion of the container are substantially animal-shaped.

14. The article of claim 13, wherein the animal shape is in the form of a rabbit.

15. A method of releasably securing a candy within a container, comprising:
   providing a three-dimensionally shaped edible candy having an outer surface comprising chocolate;
   providing a hollow container comprising a wall defining an exterior surface and an interior surface, the interior surface defining a hollow portion having a shape which substantially conforms to the three-dimensional shape of the candy for releasably securing the candy within the hollow shape of the container, wherein the container comprises at least two portions removably secured to one and the other for releasably securing the candy, and further wherein the container comprises a plastic material;

securing the candy within the container;

providing an air space of from about 0.1 mm to about 2 mm so that substantial portions of the candy are non-abuttingly disposed away from the interior surface of the container; and heat wrapping a plastic sleeve over a portion of the exterior surface of the container, wherein the air space is formed between the candy and the interior surface of the container proximal to the plastic sleeve and further wherein the candy within the container is not melted or deformed by elevated temperatures of the heat wrapping, and further wherein portions of the edible product contact the interior surface of the container at a location distal from the plastic wrapping.

16. An article of manufacture comprising:

a three-dimensionally shaped, heat or moisture sensitive edible product;

a hollow container comprising a wall defining an exterior surface and an interior surface, the interior surface defining a hollow portion having a shape which substantially conforms to the three-dimensional shape of the edible product for releasably securing the edible product within the hollow shape of the container, wherein the container comprises at least two portions hingeably secured to one and the other for releasably securing the edible product, and further wherein the container comprises a plastic material; and a removable plastic covering over a portion of the exterior surface of the container wherein the plastic covering is a shrink-wrapped plastic covering, wherein an air space of from about 0.1 mm to about 2 mm is disposed between substantial portions of the edible product and the interior surface of the container, such that substantial portions of the edible product are non-abuttingly disposed away from the interior surface of the container proximal to the plastic wrapping, and further wherein portions of the edible product contact the interior surface of the container at a location distal from the plastic wrapping.

17. A method of releasably securing a heat or moisture sensitive edible product within a container, comprising:

providing a three-dimensionally shaped edible heat or moisture sensitive edible product having an outer surface;

providing a hollow container comprising a wall defining an exterior surface and an interior surface, the interior surface defining a hollow portion having a shape which substantially conforms to the three-dimensional shape of the edible product for releasably securing the edible product within the hollow shape of the container, wherein the container comprises at least two portions hingeably secured to one and the other for releasably securing the edible product, and further wherein the container comprises a plastic material;

securing the edible product within the container;

providing an air space of from about 0.1 mm to about 2 mm so that substantial portions of the edible product are non-abuttingly disposed away from the interior surface of the container; and heat wrapping a plastic sleeve over a portion of the exterior surface of the container wherein the air space is formed between the edible product and the interior surface of the container proximal to the plastic sleeve and further wherein the edible product within the container is not melted or deformed by elevated temperatures of the heat wrapping, and further wherein portions of the edible product contact the interior surface of the container at a location distal from the plastic wrapping.

18. The article of manufacture of claim 17, further comprising a living hinge, wherein the at least two portions of the container are secured to one and the other by the living hinge and further and further wherein the living hinge is disposed away from the plastic wrapping.

* * * * *